United States Patent
Magnuson et al.

(10) Patent No.: US 12,401,563 B2
(45) Date of Patent: Aug. 26, 2025

(54) METHODS, SYSTEMS, AND COMPUTER READABLE MEDIA FOR DETECTING NETWORK SERVICE ANOMALIES

(71) Applicant: Keysight Technologies, Inc., Santa Rosa, CA (US)

(72) Inventors: Marc Owen Magnuson, Austin, TX (US); Stefan Jan Johansson, Round Rock, TX (US); Deep Datta, Austin, TX (US); George Lache, Cedar Park, TX (US); Ethan Paul Spurlock, Cedar Park, TX (US); Gregory Lane Singleton, Liberty Hill, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 333 days.

(21) Appl. No.: 18/109,826

(22) Filed: Feb. 14, 2023

(65) Prior Publication Data
US 2024/0235923 A1 Jul. 11, 2024

Related U.S. Application Data

(60) Provisional application No. 63/437,708, filed on Jan. 8, 2023.

(51) Int. Cl.
*H04L 41/0631* (2022.01)
*H04L 41/16* (2022.01)

(52) U.S. Cl.
CPC .......... *H04L 41/0631* (2013.01); *H04L 41/16* (2013.01)

(58) Field of Classification Search
CPC ............................. H04L 41/0631; H04L 41/16
USPC ......................................................... 709/224
See application file for complete search history.

(56) References Cited

U.S. PATENT DOCUMENTS

| | | |
|---|---|---|
| 9,094,444 B2 | 7/2015 | Baltatu et al. |
| 9,386,103 B2 | 7/2016 | Clifton et al. |
| 9,609,009 B2 | 3/2017 | Muddu et al. |
| 10,009,364 B2 | 6/2018 | Dasgupta et al. |

(Continued)

OTHER PUBLICATIONS

Orsolic and Skorin-Kapov, "A Framework for In-Network QoE Monitoring of Encrypted Video Streaming", IEEE Access, vol. 8, pp. 74691-74706 (2020).

(Continued)

*Primary Examiner* — Hermon Asres

(57) ABSTRACT

Methods, systems, and computer readable media for detecting network service anomalies. An example method includes, during a learning phase, detecting a client initiating a first network interaction with an application and recording a start time for the first network interaction with the application; determining that the first network interaction with the application has ceased and recording an end time for the first network interaction; and determining, based on the start time and the end time, an application interaction rate for the first network interaction with the application. The method includes, during a detection phase, detecting the client initiating a second network interaction with the application; determining a second application interaction rate for the second network interaction; and determining that a network service anomaly occurred during the second network interaction based on the first application interaction rate and the second application interaction rate.

18 Claims, 5 Drawing Sheets

(56) References Cited

U.S. PATENT DOCUMENTS

| | | | |
|---|---|---|---|
| 10,404,732 | B2 | 9/2019 | Munro et al. |
| 10,459,827 | B1 | 10/2019 | Aghdaie et al. |
| 10,574,512 | B1 | 2/2020 | Mermoud et al. |
| 10,716,017 | B2 | 7/2020 | Lyon et al. |
| 10,887,786 | B2 | 1/2021 | Vedam et al. |
| 11,190,417 | B2 | 11/2021 | Raney et al. |
| 11,265,337 | B2 | 3/2022 | Smelov et al. |
| 11,507,488 | B2 | 11/2022 | Orzell et al. |
| 11,949,570 | B2 | 4/2024 | Pandey et al. |
| 2010/0153316 | A1 | 6/2010 | Duffield et al. |
| 2015/0113133 | A1 | 4/2015 | Srinivas et al. |
| 2016/0014152 | A1* | 1/2016 | Buruganahalli ........ H04L 63/20 726/9 |
| 2017/0332256 | A1* | 11/2017 | Gupta ................. H04L 41/0631 |
| 2017/0339022 | A1 | 11/2017 | Hegde et al. |
| 2019/0222591 | A1 | 7/2019 | Kislitsin et al. |
| 2020/0106795 | A1 | 4/2020 | Servajean et al. |
| 2020/0314128 | A1 | 10/2020 | Hild |
| 2020/0364561 | A1 | 11/2020 | Ananthanarayanan et al. |
| 2022/0239720 | A1 | 7/2022 | Madanapalli et al. |
| 2023/0031654 | A1 | 2/2023 | Pandey et al. |

OTHER PUBLICATIONS

Bartolec, et al. "Impact of User Playback Interactions on In-Network Estimation of Video Streaming Performance", IEEE Transaction On Network And Service Management, vol. 19, No. 3, pp. 3547-3561 (2022).

Commonly-Assigned, co-pending U.S. Appl. No. 17/390,860 for "Methods, Systems, and Computer Readable Media for Utilizing Machine Learning to Automatically Configure Filters at a Net" (Unpublished, filed Jul. 30, 2021).

Nguyen et al., "GEE: A Gradient-based Explainable Variational Autoencoder for Network Anomaly Detection," arXiv:1903. 06661v1, pp. 1-10 (Mar. 15, 2019).

Sanjuas, "Application of Machine Learning to Flow-based Network Monitoring," Polygraph.io, pp. 1-13 (2016).

Saboori et al., "Automatic firewall rules generator for anomaly detection systems with Apriori algorithm," 2010 3rd International Conference on Advanced Computer Theory and Engineering (ICACTE), pp. 1-4 (2010).

Pranschke et al., "Automated Firewall Rule Set Generation Through Passive Traffic Inspection," Conference: Information Security South Africa Conference, pp. 1-10 (Jan. 2009).

Mahoney et al., "PHAD: Packet Header Anomaly Detection for Identifying Hostile Network Traffic," Florida Institute of Technology Technical Report CS-2001-04, pp. 1-17 (2001).

Balakrishnan, et al., "A Study of the Classification Capabilities of Neural Networks Using Unsupervised Learning: A Comparison with K-Means Clustering", the Psychometric Society, 17 pages (1994).

Non-Final Office Action for U.S. Appl. No. 17/390,860 (Jun. 29, 2023).

Shabtai, et al., "F-Sign: Automatic, Function-Based Signature Generation for Malware" in IEEE Transactions on Systems, Man, and Cybernetics, Part C (Applications and Reviews), vol. 41, No. 4, pp. 494-508, Jul. 2011, doi: 10.1109/TSMCC.2010.2068544.

Notice of Allowance for U.S. Appl. No. 17/390,860 (Dec. 5, 2023).

* cited by examiner

METHODS, SYSTEMS, AND COMPUTER READABLE MEDIA FOR DETECTING NETWORK SERVICE ANOMALIES

PRIORITY CLAIM

This application claims the benefit of U.S. Provisional Patent Application Ser. No. 63/437,108 filed Jan. 4, 2023, the disclosure of which is incorporated herein by reference in its entirety.

TECHNICAL FIELD

The subject matter described herein relates to network testing. More specifically, the subject matter relates to methods, systems, and computer readable media for detecting network service anomalies.

BACKGROUND

A network operator may want to know about service anomalies on its network for several reasons. One of the main reasons is that service anomalies can indicate that there is an issue with the network infrastructure or with the services being provided. These issues can lead to decreased network performance, increased downtime, and a poor user experience. Additionally, service anomalies can also indicate that there is a security issue with the network, such as a potential cyber-attack. Knowing about service anomalies allows the network operator to quickly identify and resolve any issues, which can help to minimize the impact on the network and its users. Furthermore, Network operators can use this information to improve their service and prevent recurrence of the same problem.

Accordingly, a need exists for methods, systems, and computer readable media for detecting network service anomalies.

SUMMARY

Methods, systems, and computer readable media for detecting network service anomalies. An example method includes, during a learning phase, detecting a client initiating a first network interaction with an application and recording a start time for the first network interaction with the application; determining that the first network interaction with the application has ceased and recording an end time for the first network interaction; and determining, based on the start time and the end time, an application interaction rate for the first network interaction with the application. The method includes, during a detection phase, detecting the client initiating a second network interaction with the application; determining a second application interaction rate for the second network interaction; and determining that a network service anomaly occurred during the second network interaction based on the first application interaction rate and the second application interaction rate.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for detecting network service anomalies. In particular, this document describes an example visibility behavior analysis system (VBAS). The VBAS can determine a network interaction metric, called an application interaction rate, to identify variations in user population behavior to detect degradations in quality of service.

Application interaction rate is a metric that measures a user's interaction with an application (e.g., one or more servers in a network domain) across multiple connections and will work on encrypted traffic. By building a profile of interactions for a client, the VBAS can identify variations in behavior and determine if the client is experiencing degradations in quality of service due to network service anomalies.

The application interaction rate can reflect network service anomalies in situations where, for example, a user will interact less on a bad quality connection to an application like a video streaming service. The VBAS can measure the application interaction rate and, in some cases, other metrics to determine when a client stops interacting with the application. For example, a short interaction time with some high latency could suggest that the connection to the application was unusable so the client ended the interaction.

Figure 1:
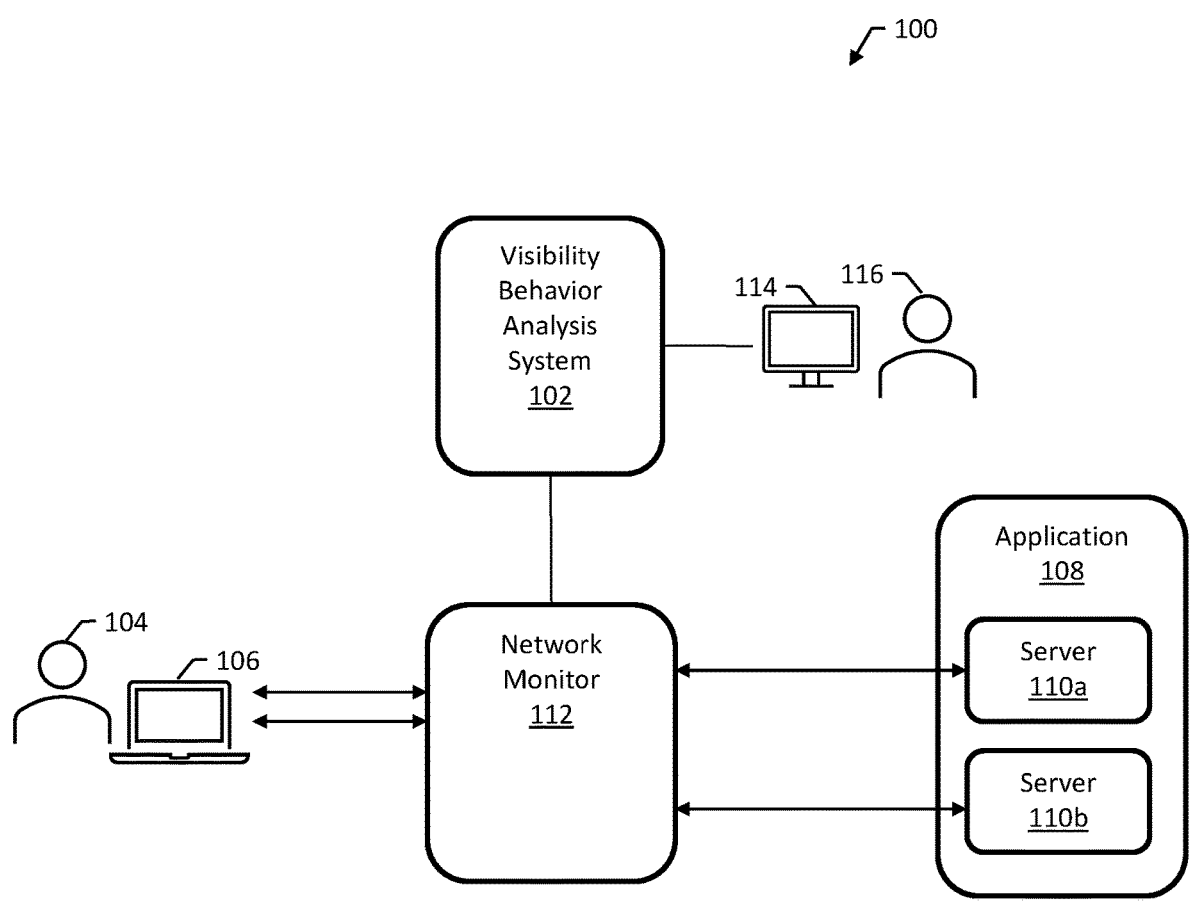
FIG. 1 is a block diagram of an example network environment for an example visibility behavior analysis system (VBAS)

FIG. 1 is a block diagram of an example network environment 100 for an example VBAS 102. A user 104 on a client device 106 (e.g., a personal computer, laptop, tablet, or mobile phone) initiates a network interaction with an application 108 over a data communications network. The VBAS 102 can detect network anomalies and output reports regarding the network anomalies, for example, by displaying a graphical user interface (GUI) on a display screen 114 to a network operator 116.

The application 108 typically provides a remote service to various client devices over the network; for example, the application 108 can be a video streaming application, a video calling application, or a gaming application. The application 108 can be implemented on a number of different application servers 110*a-b* within a network domain.

The network interaction can include a number of different encrypted connections between the client device 106 and the application 108 over a period of time. For example, suppose that the application 108 is a video streaming application. The client device 106 may establish a first encrypted connection with a first application server 110a to watch a first video. Then, later, the client device 106 may establish a second encrypted connection with a second application server 110b to watch a second video.

A network monitor 112 is configured for monitoring the network interaction between the client device 106 and the application 108. The network monitor 112 can be, for example, a network packet broker (NPB), which is a device or software system that is used to process, filter, and distribute network traffic. It sits in-line with the network traffic and acts as a central point for managing and monitoring network traffic flows. NPBs are typically used in enterprise networks, data centers, and service provider networks to provide visibility and control over network traffic.

A network packet broker can be configured to aggregate and correlate data from multiple network sources and applications, such as network taps, switches, routers, and servers, and then combine this data into a single, unified view. This allows network administrators to easily monitor and troubleshoot network issues, as well as gain insights into network usage and performance. A network packet broker can also be used to filter and forward specific types of network traffic to different tools or applications for further analysis, such as security tools, network monitoring tools, and analytics platforms.

In this case, the network monitor 112 provides data characterizing network interactions to the VBAS 102. For example, the network monitor 112 can provide NetFlow data to the VBAS 102.

NetFlow data is a type of network protocol data that provides detailed information about the flow of network traffic, including information about the source and destination IP addresses, ports, protocols, and the number of bytes and packets transmitted. The VBAS 102 can use this data to monitor the amount of time that the client device 106 is interacting with the application 108 over the network by analyzing the flow of network traffic between the client device 106 and the application 108.

The VBAS 102 can first collect and process the NetFlow data to identify the IP addresses and ports of the client device 106 and the application servers 110a-b. The VBAS 102 can then monitor the flow of traffic between these two devices, tracking data such as the number of bytes and packets transmitted over time. The flow of traffic can include multiple flows of encrypted traffic, and the VBAS 102 can correlate across all encrypted flows between the two devices regardless of a single connection's state. By analyzing this data, the VBAS 102 can determine how much time the user 104 is spending interacting with the application 108. The VBAS 102 can also track and monitor the traffic data over time, so it can detect and notify any unusual behavior, such as an increase or decrease in network traffic, that might indicate a problem with the network or the application 108.

The NetFlow data (or any metadata collected by the system) can also be used to track the number of active connections and the duration of those connections between the client device 106 and the application servers 110a-b. This can provide a more accurate measure of the user's interaction with the remote application 108, as it considers the number of connections and the amount of time spent on each connection, with the aggregate time spent from the first connection to the last connection comprising the application interaction rate.

The VBAS 102 and/or the network monitor 112 can detect the client device 106 initiating a network interaction with the application 108 using any appropriate application detection techniques. For example, where the connections are encrypted, the network monitor 112 can use Transport Layer Security (TLS) parsing to identify an application name for the application 108. TLS is a protocol that is used to encrypt network traffic and ensure secure communication between devices. When the network monitor 112 is trying to identify applications within encrypted traffic using TLS parsing, it can perform one or more of the following steps:

Decrypting the traffic using the appropriate security keys and certificates. This allows the network monitor 112 to see the original, unencrypted data that is being transmitted.

Parsing the decrypted traffic to extract information about the TLS handshake. This includes information such as the client and server hello messages, the negotiated cipher suite, and the certificate information.

Analyzing the traffic and identifying the specific application that is being used. For example, if the network monitor 112 sees a certificate from a known e-commerce site, it can identify that the traffic is related to an online shopping application.

Within TLS, it is not always required to decrypt the traffic to extract the handshake information. Generally, within TLS 1.2, the handshake (client hello & server hello) is unencrypted, and the information can be parsed freely without any knowledge of keys. TLS 1.3 also has this information available.

After identifying the application, the network monitor can forward the application name and other data to the VBAS 102. The VBAS 102 can use the data to determine the amount of time that the client device 106 is interacting with the application 108. The VBAS 102 can do this using any appropriate algorithm, e.g., by calculating the time difference between the first and last packets of data across any connection (even if there are multiple) between a client and a given application. The application interaction rate is described further below with reference to FIG. 2.

The VBAS 102 is then able to detect an anomaly in the network service based on the amount of time that the client device interacts with the application. For example, if the client device 106 is interacting with the application 108 for an unusually long or short period of time, the VBAS 102 can flag this as an anomaly, e.g., by displaying a message on the display 114 to the network administrator 116.

In some examples, the VBAS 102 is configured to monitor multiple client devices and multiple applications in parallel, as well as to track the communication over time. This will allow the VBAS 102 to detect patterns of abnormal behavior and to alert the network administrator 116 if a problem is detected.

The VBAS 102 is configured for grouping together related network connections into a single network interaction. This allows the VBAS 102 to keep track of a client device's interactions with the application 108, even though the session is composed of multiple connections. In the case of an application like a video streaming service, where the client device 106 establishes multiple connections to different servers 110a-b within the domain to stream a video, grouping the connections allows the VBAS 102 to keep track of the user's entire streaming session as a single network interaction, rather than multiple separate connections.

Grouping multiple connections into a single network interaction can include one or more of the following steps:
- Identifying connections that belong to a single session. This is usually done by looking at the IP address, port, and timestamp of each connection, as well as other information such as the protocol used.
- The system can also use an application name or identifier for grouping connections. For example, a network interaction can include a series of one or more bi-directional connections in parallel or in sequence belonging to a given application and client pair. This can be useful, for example, when the application has multiple servers (and different IP addresses) across a region, and the user is redirected from server to server without notice. The system can track the network interaction regardless of the number of server swaps that occur on the backend of the application.
- Once the connections are identified, grouping connections into a single interaction, e.g., using an interaction identifier.
- After the connections are grouped into an interaction, relevant information is extracted from the connections to characterize the entire interaction, such as the duration of the interaction, the total number of bytes sent, and the total number of packets sent.
- The extracted data, as well as the corresponding identifier and timestamps, can be stored in a database or other storage mechanism for later analysis.
- The extracted data is then analyzed to detect patterns and trends in the network service, as well as to detect anomalies in the network service.

Although FIG. 1 shows the network monitor 112 and the VBAS 102 as separate systems that communicate with each other, the two components can be integrated into a single system. For example, a network packet broker could be configured or augmented with the functions of the VBAS 102.

In some examples, the system infrastructure is distributed to meet the network data tracking needs of the VBAS 102. For example, the network monitor 112 can be moved to the edge of a network where training and tracking can be performed for a certain set of users. Then data can be exported back to a central server.

Using application interaction rate, the VBAS 102 can also detect trends by aggregating user data at a central server and monitoring variations in a population of given behavior by creating and training models on a weekly basis using machine learning at the edge nodes. This trend tracker can be used on a larger scale to identify what users are doing the most on a given network. Population trend tracking allows ISPs (Internet Service Providers) or other entities to provide feedback on network usage.

Figure 2:
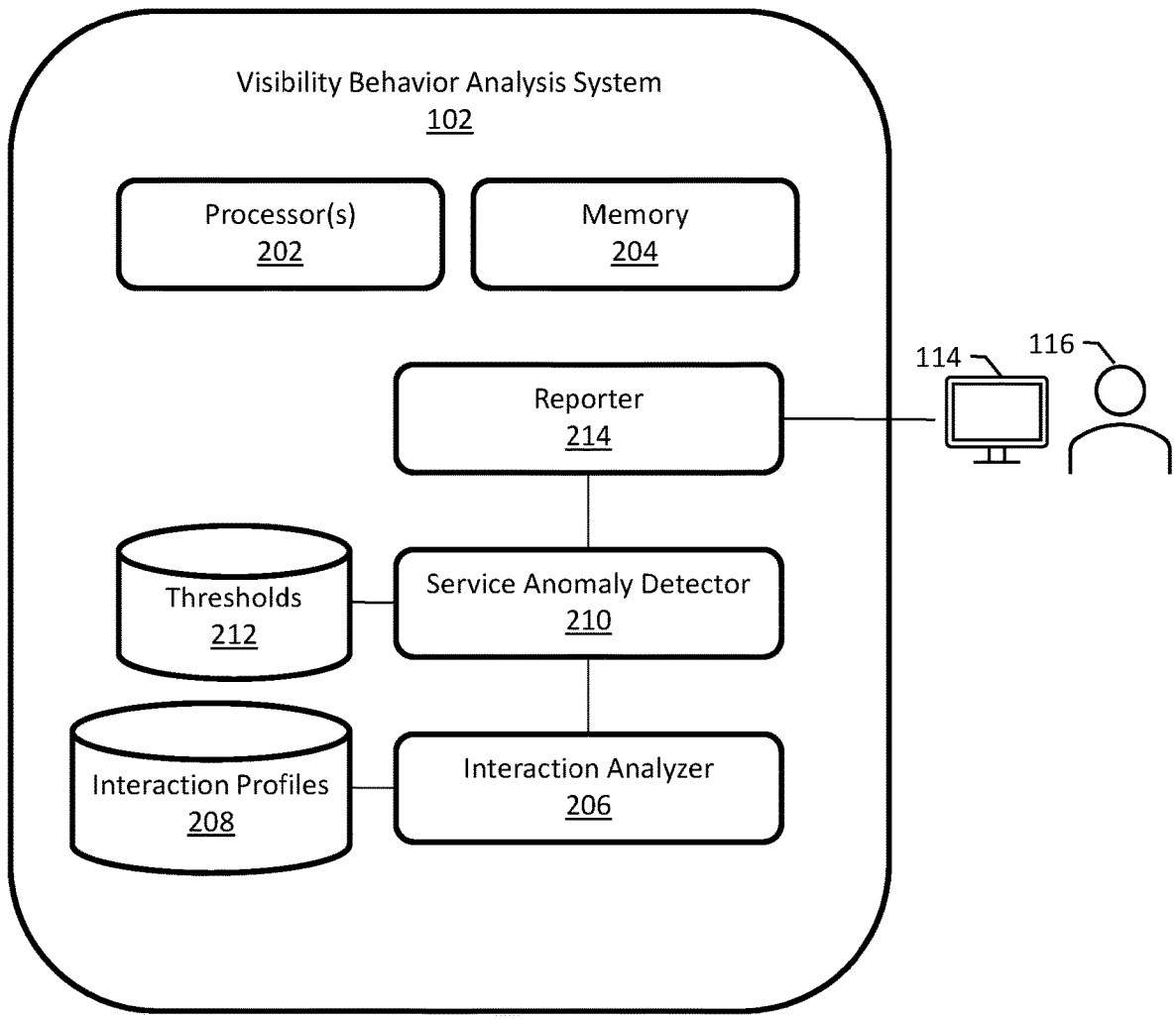
FIG. 2 is a block diagram of an example VBAS.

FIG. 2 is a block diagram of an example VBAS 102. The VBAS 102 is a computer system including one or more processors 202 and memory 204 storing instructions for the processors 202. The functional components of the VBAS 102 can be implemented as software installed on the computer system.

The VBAS 102 includes an interaction analyzer 206. The interaction analyzer 206 is configured for analyzing network interactions and building interaction profiles 208. In particular, the interaction analyzer 206 is configured for determining an application interaction rate for an interaction.

A user's chosen domains that are interacted with imply the user behavior and activity on their networks. The interaction analyzer 206 is configured to determine the application interaction rate by observing how long a client maintains an interaction (there may be multiple sessions and/or connections) with an application, which can have multiple servers and/or application instances, so that the IP address of the server can change and be different from request to request depending on the application's implementation and activity.

The application interaction rate can be calculated as the time of the very first connection opened with a given client to the last time a connection was seen active for that same client for a given application. A client can be interacting with multiple servers (e.g., with a video streaming application), but the interaction analyzer 206 will track the interaction as a single interaction.

A threshold (e.g., set by the network administrator 116) can be used to determine how long to wait for activity before marking the interaction as complete. Typically, the threshold wait time for inactivity is not part of the calculations for application interaction rate. The time tracking can be performed separate from the threshold functionality to ensure data integrity.

The network device initiating the connection is typically considered the client. Application servers, in general, rarely reach out to a client device. Many security configurations would not allow for this behavior as it can require a form of port forwarding or IP passthrough to achieve.

By storing a list of client IP addresses (or other client identifiers) and active interactions with an interaction identifier (such as application name) to track, the interaction analyzed 206 can determine a user's application interaction rate. The application interaction rate can be used by itself to detect network anomalies, or it can be used with other data.

For example, consider a single client interaction with a video streaming application. A client in this case could be the public IP of a home address if the internet service provider (ISP) is using it at their edge. When a connection is opened to the video streaming application, the interaction analyzer 206 can start a timer. This timer will indicate how long a user interacts with the video streaming application. The interaction analyzer 206 stops the timer when all connections to the video streaming application have ceased for at least a configurable threshold of time.

The client can be a single user, or alternatively, the client can be a group of users or even an entire population. For example, consider the case where two members of a household are using a video streaming application but watching different videos on different devices. The system can be configured to consider the household as a client, so that the network interaction would be tracked for the entire household over a period of time.

In a learning phase, the interaction analyzer 206 dynamically builds an application-specific interaction profile for each user and stores the profile in the repository of interaction profiles 208. In a detection phase, traffic is analyzed for identifying application-specific connections for a client and building new profiles. A service anomaly detector 210 is configured for accessing the previously-generated application-specific interaction profiles to determine whether the client is likely experiencing or has experienced a network service anomaly for the service being provided by the application.

In general, the generated profiles are used for training a model, and typically, the generated profiles are not used for inferencing directly. Previously generated profiles can be stored, for example, to create a new instance of the service anomaly detector 210, rather than being referenced themselves as the anomaly detection reference.

The service anomaly detector 210 can use, for example, a repository of application-specific quality of service thresholds 212 to determine whether to trigger a notification of a network service anomaly. The service anomaly detector 210 analyzes a network interaction, produces a score characterizing the interaction, compares the score to the threshold for the application, and detects an anomaly if the score exceeds the threshold.

The VBAS 102 can include a reporter 214 configured for producing output reports based on the analysis performed by the service anomaly detector 210. The output reports can include some, none, or all of the data characterizing the network interactions. The output reports can include the score characterizing the interaction and the threshold, or the output reports can include simply whether or not a network service anomaly was detected. In general, the reporter 214 can generate any appropriate type of output based on the analysis of a network interaction.

In some examples, the reporter 214 includes a graphical user interface (GUI) for display on a display device 114 to a network administrator 116. The GUI is configured to display information and allow the network administrator to interact with it. The GUI could be designed to alert the network administrator if a network service anomaly is detected by the VBAS 102.

For example, the GUI can include one or more of the following elements:

Dashboard: A dashboard that displays a real-time overview of the network service, including information such as the number of clients connected, the number of packets sent, and the number of bytes sent.

Alerts: A section of the GUI that displays alerts generated by the VBAS 102, such as an anomaly detection. The alerts could be color-coded by severity and include details such as the time of the anomaly, the client device and application that the anomaly occurred with, as well as the type of anomaly.

Historical data: A section of the GUI that displays historical data, such as the number of anomalies detected over time, to allow the network administrator to see the trends and patterns of the network service.

Configuration: A section of the GUI that allows the network administrator to configure the program, such as setting the threshold for anomaly detection, and selecting the feature vectors that the program should extract from the network traffic.

Reports: A section of the GUI that generates reports on the performance of the network service, such as the number of anomalies detected over time, and the number of clients connected to the network service.

Search: A section of the GUI that allows the network administrator to search for specific events or anomalies.

The GUI can be configured to be accessible remotely, such as over the internet, to allow the network administrator to monitor the network service from anywhere.

Figure 3:
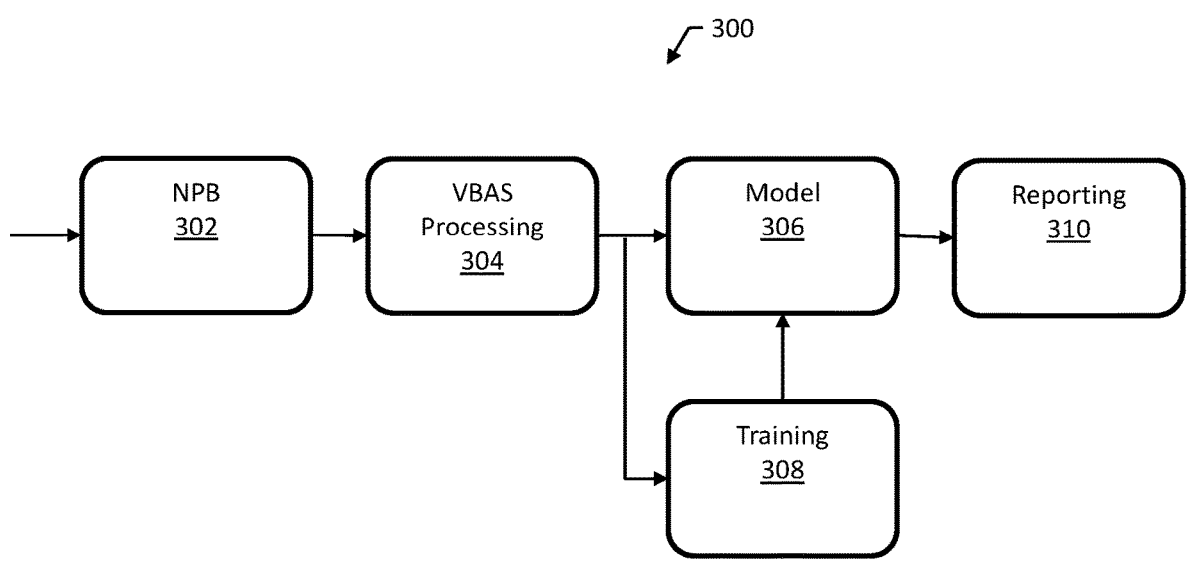
FIG. 3 is a block diagram illustrating a system for detecting network service anomalies using machine learning.

FIG. 3 is a block diagram illustrating a system 300 for detecting network service anomalies using machine learning. The system includes a network packet broker 302 (or other appropriate network monitor) supplying captured network communication information to a VBAS 304 for processing. The VBAS 304 uses the captured network communication information for training of machine learning models 308 and for detecting network service anomalies using the trained models. The results can be reported 310, e.g., using a graphical user interface or by sending one or more messages to a remote computer system.

The VBAS 304 can be configured to act as an analytics and machine learning endpoint where it ingests metadata from a visibility device (such as NPB 302) and calculates specific metrics and stores transmitted values. For application interaction rate, for example, the first metadata record with the flowStart value can be used as the start of an interaction. For every subsequent metadata record, the system updates the end of the interaction with flowEnd. The data can be tracked in a table until the interaction is marked complete.

A feature vector is an array (sometimes matrix) of values that represent certain concepts and metrics. This feature vector can be used for inferencing or stored as data for training of a model. Inferencing is the process in which a feature vector is input into a trained model with the goal of getting a certain mean squared error or score to indicate if that feature vector was anomalous. The threshold for this score can be set based on how the model is configured. For example, the threshold can be a pre-determined value set by a user such that the user receives an alert when that anomaly score is reached.

The feature vector used by the VBAS 304 typically contains the application interaction rate. The application interaction rate can be a key metric in the feature vector itself, and it can also be used to determine when to export the feature vector to a visualizer such as ELK (ElasticSearch, LogStash, Kibana) and run it through the machine learning process. When an application interaction rate has passed a given threshold, the feature vector is finalized and wrapped up, sent out to the model, and exported to a visualizer.

In general, the feature vector can include any appropriate information for characterizing a user's interaction with an application over a period of time. Below is a list of example features. One or more of these features can be included in the feature vector.

1. Application interaction time
   a. Threshold bound across all connections
   b. Total app interaction time because vectors are exported when app interaction time is complete
   c. Limited to 24 hours to prevent excessive durations
2. Duration of a flow
   a. Standard deviation
   b. Average
   c. Max
   d. Min
3. Bitrate
   a. Bitrate averaged over all connections
   b. Standard deviation of bitrate across all flows
   c. Max bitrate
4. Bytes (Total bytes across all connections)
   a. Spikes in bandwidth can indicate a buffer catching up
   b. Uplink
   c. Downlink
5. Latency/App Response time
   a. Average latency
   b. Standard deviation of latency
   c. Max/Min latency
6. Packet total
   a. Uplink
   b. Downlink
7. Number of connections (Buckets)
   a. #Of 10 second flows
   b. #Of 1-minute flows
   c. #Of flows over 1 minute
   d. Scrolling, load balancing (Netflix)

8. Packet Size Distribution
9. Time of day

The items in this list are described in more detail below.

Connection lifetime (Duration of a flow)

The lifetime of a connection, otherwise known as its duration. Keeping track of the average duration of a connection along with the standard deviation between connections—the system can determine how long a session remains open. This may be a good indicator for load balancing, for example, with video streaming services, where a user may be offloaded to a different server under load.

The connection lifetime is also a good indicator for how the user is interacting with the application. For example, if the system detects many short-lived connections for a given user on a video streaming service—it can indicate that a user is scrolling through the home page looking for a movie to watch. The system can generate models on a per-application basis, so that the system can determine what normal looks like for each specific application of a number of different applications.

Duration of flow is calculated from the initial handshake a user initiates to the closing of the connection. In the case of TCP (Transport Control Protocol), it would be from the very first SYN to the very last FINACK. Metrics used for connection lifetime are standard deviation, average, max, and minimum.

Number of Connections

Tied closely to connection lifetime, this can vary from application to application depending on implementation. The driving factor behind this feature is to realize that some applications may generate varying amounts of connections depending on load and user behavior.

To help with the number of connections, the system can group them into buckets. So instead of having certain numbers, the system can have certain buckets indicating general connection counts based on the duration of a given connection. This way, it is possible to distinguish the difference between one-minute connections and ten-second connections numerically.

Latency & App Response Time

Latency and application response time are similar, but not the same. Since the system may be analyzing encrypted traffic, there are some connections where it cannot calculate true latency due to either the encryption of packet numbers (QUIC) or the lack thereof (UDP). In VBAS, the system can recognize the two metrics as equivalent. Latency is an accurate App Response Time based on observed interactions whereas App Response Time is an estimate of latency. TCP connections will give exact and accurate values; UDP and QUIC will give estimates.

ARS (App Response Time) can be useful to include in the feature vector because it is a key metric and indicator of performance. Since the VBAS 304 can train on regional traffic, it can determine the norm for a given region. 110 ms may be a common latency (ARS) to have in one part of Texas, but 40 ms may be common in another part of Texas. Based on the learned behavior, the VBAS 304 will determine deviations and identify anomalies in that behavior.

For QoS (Quality of Service) in particular, the latency may increase (worse performance), but we expect that the overall interaction time will decrease. One metric may not be sufficient to yield a quality score on its own. When combining quality metrics with user behavioral analytics— the VBAS 304 can identify a true loss in quality for any given user on that network.

Bitrate

Bitrate represents the quality of a video being transmitted. A higher bitrate indicates a higher quality audio and video playback. This may be important for some services such as cloud gaming and video streaming. Many applications use adaptive bitrate which dynamically lowers or increases the bitrate based on the quality of the connection. Slower speed and increased latency will trigger a downward shift in bitrate and vice versa.

Bytes

The number of bytes transmitted across all connections. This metric is directly tied to bitrate and to user behavior. An increase in bytes may imply the user is interacting more and downloading more data. It can also indicate how much data they can process in each interaction window. Some of these metrics can be more useful in the context of windowing, which is described further below.

Uplink and downlink bytes can be tracked as separate features. Uplink being bytes sent to the server, downlink being bytes received by the client.

Packet Total

Number of packets transmitted both upstream and downstream. Uplink and downlink can be tracked as separate features.

Packet Size Distribution

The packet size distribution represents the variation in packet sizes, average packet size, and other statistics revolving around packet size.

Time of Day

Using, for example, hour of the day as a feature can have bad results due to the roll-over. For example, 23 and 2 are only three hours apart, but the value difference is 21. To solve this, the hour can be mapped to a circle and then converted to x and y coordinates. This will accurately reflect time similarities even across the roll-over.

Feature Time Windowing in Feature Vector

For the feature vector, it represents a picture of user behavior. However, on its own, it may not capture the entirety of user behavior. Assume a user is watching a video streaming service and has no issues for their entire interaction up until the last 10 minutes of their interaction. An averaged feature vector would show that the user is fine, and no anomaly would be thrown. In short, the feature vector on its own lends itself to long sustained issues or abandonment.

FTW, Feature Time Windowing, is a set of features introduced to combat this shortcoming. FTW involves keeping a copy of the user's behavior but for different durations. Instead of a simple feature vector representing the entire interaction, the system can also analyze features in addition to this that track a last period. This does not mean tracking an indefinite period.

For example, the system can track the last 5, 10, and 15 minutes for certain features in the feature vector. The feature vector would have a total user behavior picture in addition to the latest interactions as well. If a user experiences poor QoS towards the end of a session, this would identify and highlight that.

Some of these 5/10/15 min window features include but are not limited to:

1. Latency & App Response Time
2. Connection Lifetime
3. Bitrate
4. Bytes
5. Packets
6. Packet size distribution
7. Number of connections These features can be treated as normal features in the feature vector, and they are just calculated over a windowed period instead of a global period.

Unsupervised Machine Learning

Leveraging the application interaction rate, the system can develop an expected behavior for a user by training on their daily usage patterns. This model can then identify outliers where a new application is introduced into the mix for a substantial period. A substantial period implies that the user has interacted with the app longer than a given threshold. This threshold would be subject to modification but should be greater than 5 minutes of interaction. The model can also track if there are changes of application interaction rate for established applications previously seen on those models.

Unsupervised learning is a type of machine learning where the model is not given any labeled data, and the model must find patterns and structure in the data on its own. The process of using unsupervised learning to detect anomalies in a network service can include one or more of the following steps:

Collecting data: The first step is to collect a dataset of feature vectors that represents the normal behavior of the network service. This dataset would be collected over a period of time and would include feature vectors from multiple client devices and multiple applications.

Training: In some examples, the next step is to use a clustering algorithm to group the feature vectors into clusters based on their similarity. The clustering algorithm will create clusters of feature vectors that are similar to each other, and it will separate feature vectors that are dissimilar. Clustering is one example of many different machine learning methods. Any appropriate method can be used. For example, a neural network can be used.

Anomaly detection: After the clustering step, the next step is to use an anomaly detection algorithm to identify feature vectors that deviate from the clusters. These deviating feature vectors are considered as anomalies.

Validation: After the anomalies are detected, the model's performance is evaluated on a separate dataset of feature vectors that the model has not seen before, to detect any overfitting or underfitting issues.

Deployment: Once the model is validated, it can be deployed in the network packet broker to monitor the network traffic in real-time.

The anomaly detection step involves identifying feature vectors that deviate according to an appropriate machine learning algorithm. There are several different algorithms that can be used for anomaly detection. For example, one or more of the following methods can be used:

Density-based methods: These methods identify anomalies based on the density of the feature vectors in the clusters. Anomalies are identified as feature vectors that are in a low-density area of the cluster.

Distance-based methods: These methods identify anomalies based on the distance of the feature vectors from the cluster centroid. Anomalies are identified as feature vectors that are far away from the cluster centroid.

Statistical methods: These methods identify anomalies based on the statistical properties of the feature vectors. Anomalies are identified as feature vectors that deviate from the normal distribution of the feature vectors.

Reconstruction-based methods: These methods identify anomalies based on the reconstruction error of the feature vectors. Anomalies are identified as feature vectors that cannot be well reconstructed by the model.

Feature Vector Transformation

In some examples, processing is performed on the feature vector before it is used in a machine learning model. For example, all values may be scaled to the input range, for example 0.0-1.0. Sometimes a feature also is transformed, like time of day into x and y coordinates.

Figure 4:
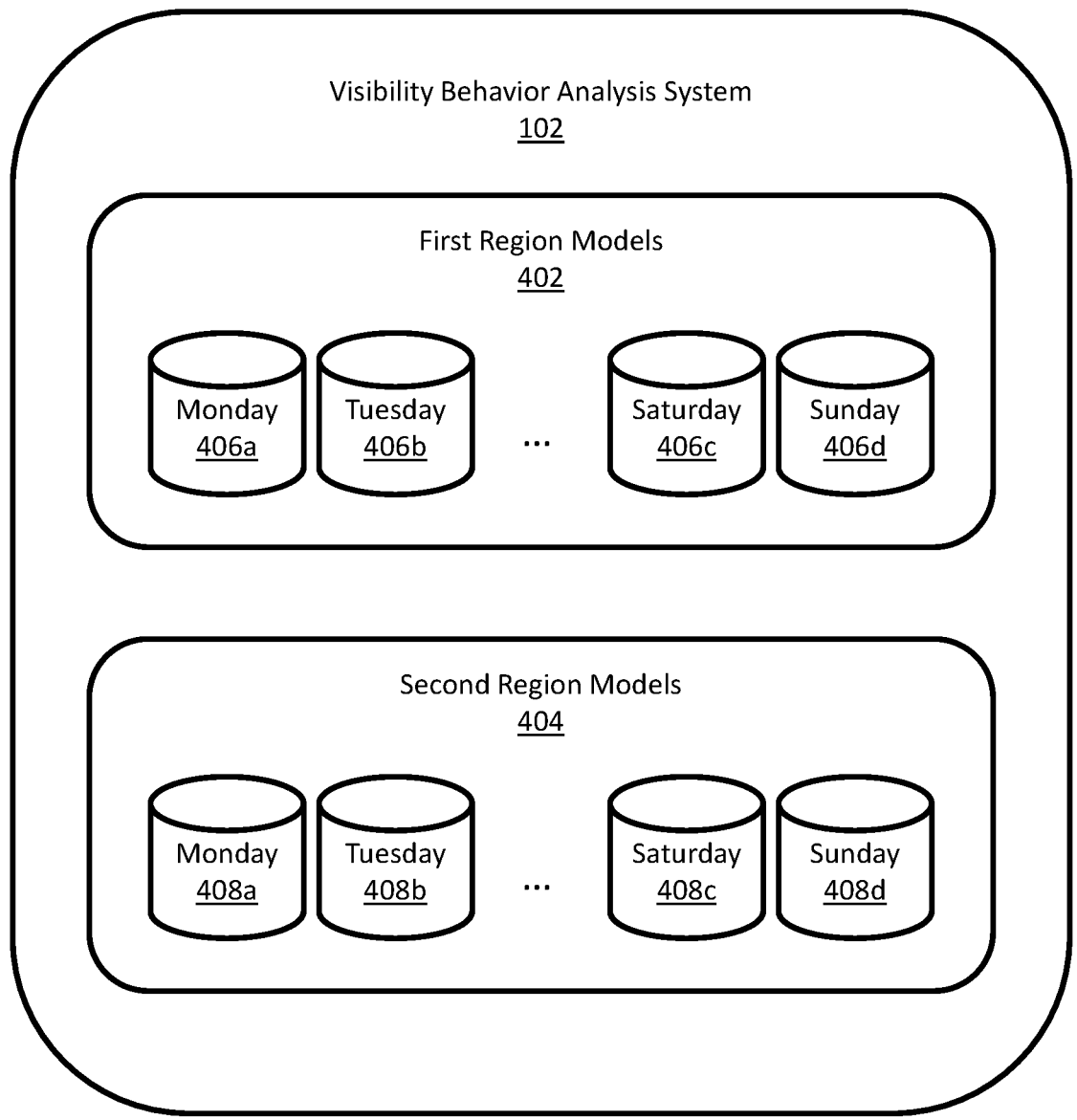
FIG. 4 is a block diagram illustrating an example organization of machine learning models for the VBAS.

FIG. 4 is a block diagram illustrating an example organization of machine learning models for the VBAS 102. To approach a balanced system, the VBAS 102 can use a 7-day approach to perform analysis on user behavior. Each day can have its own model trained for a given region. This idea stems from the expectation that a user's behavior on Saturday will be different than a Wednesday.

As shown in FIG. 4, the VBAS 102 trains a number of models 406a-d for a first geographic region 402, one for each day of the week. The VBAS 102 trains different models 408a-d for a second geographic region 404, one for each day of the week.

After the initial 7-day training time, the VBAS 102 can start to track and identify anomalies in the user behavior. The VBAS 102 can continue to retrain on new data, e.g., at configured intervals.

In some examples, the VBAS 102 gathers and generates feature vectors over the course of a training period before training itself. This means the VBAS 102 can gather feature vectors (representations of user behavior) for Monday and then train at the end of the day to be used the next week for inferencing. The VBAS 102 continuously tracks user behavior, but it does not always have a trained model on initial setup.

The VBAS 102 can use previously trained models as a baseline and use a threshold to determine if the variation in mean squared error is low enough to train a new model. New models can be trained at, e.g., regular intervals by sampling a subset of the behavior profiles across the distributed VBAS network and training a new model at a VBAS trainer that can be deployed on VBAS edge nodes. In some examples, when training for the first time, the system can use a baseline model to give a rough estimate of network health to see if training can be done.

Training can be done, e.g., daily for every selected application. Training regionally can be useful because a set of behavior profiles will vary from site to site. Unsupervised learning may perform better when detecting the behavior for an area.

Reporting of Data

VBAS will accumulate user data and export it to third party tools and even integrate with existing ad targeting systems today.

VBAS will provide per user charts which map what applications were most used (interacted with) by a given user as well as anomalies outside of their expected behavior.

Interpreting the Data

In some examples, the VBAS 102 reports a total MSE score for a feature vector (user interaction and representation of behavior) as well as feature specific MSE scores. An analyst can look at the various errors generated on different errors to get an idea of what features contributed the most to the anomaly.

Along with the machine learning values, the feature vector itself contains data analytics so a given anomaly directly shows the actual values (features) for that user interaction. This means it is not only possible to track and graph user behavior but determine the cause of an anomaly by looking at errors and their respective feature vector values.

Figure 5:
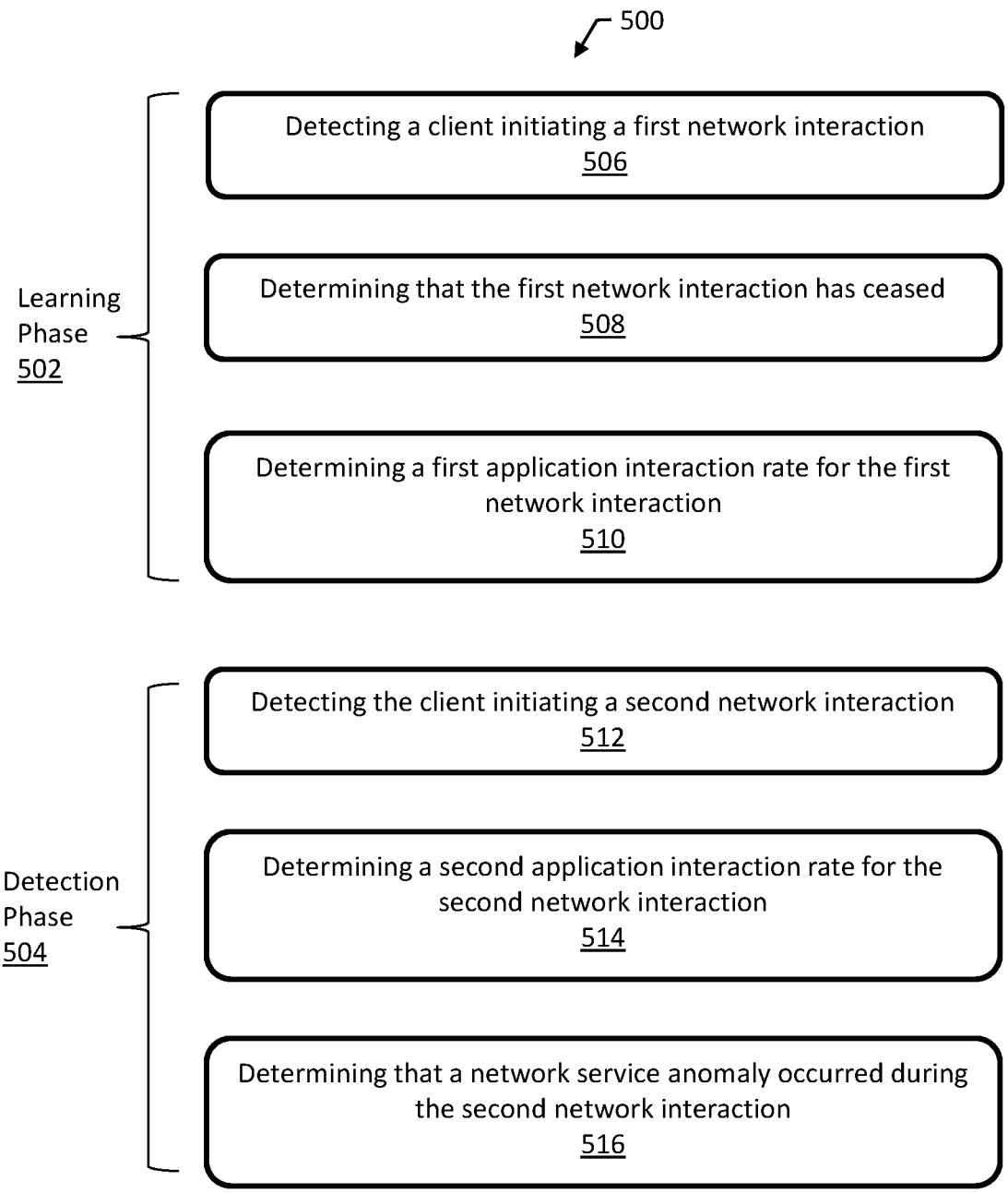
FIG. 5 is a flow diagram of an example method for detecting network service anomalies.

FIG. 5 is a flow diagram of an example method 500 for detecting network service anomalies. The method 500 can be performed by the VBAS 102 of FIG. 1. The method 500 includes a learning phase 502 and a detection phase 504.

The method 500 includes, during the learning phase 502, detecting a client initiating a first network interaction with an application and recording a start time for the first network interaction with the application (506); determining that the first network interaction with the application has ceased and recording an end time for the first network interaction (508); and determining, based on the start time and the end time, a first application interaction rate for the first network interaction with the application (510).

Generally, the method 500 can include training on many interactions for a given client, that is, for a given user or household or region/population/office. Training on multiple interactions can be useful, e.g., to provide sufficient data to produce an accurate determination of a network service anomaly.

The method 500 includes, during the detection phase 504, detecting the client initiating a second network interaction with the application (512); determining a second application interaction rate for the second network interaction (514); and determining that a network service anomaly occurred during the second network interaction based on the first application interaction rate and the second application interaction rate (516).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting network service anomalies, the method comprising:
   during a learning phase:
      detecting a client initiating a first network interaction with an application and recording a start time for the first network interaction with the application;
      determining that the first network interaction with the application has ceased and recording an end time for the first network interaction; and
      determining, based on the start time and the end time, a first application interaction rate for the first network interaction with the application; and
   during a detection phase:
      detecting the client initiating a second network interaction with the application;
      determining a second application interaction rate for the second network interaction; and
      determining that a network service anomaly occurred during the second network interaction based on the first application interaction rate and the second application interaction rate, wherein determining that the network service anomaly occurred comprises determining that the second network interaction has ceased, building a feature vector comprising the second application interaction rate and one or more other metrics observed during the second network interaction, supplying the feature vector to a machine learning model trained on one or more previous interactions with the application, and using an output of the machine learning model to determine that the network service anomaly occurred during the second network interaction.

2. The method of claim 1, wherein the first network interaction with the application comprises a plurality of different encrypted connections between the client and a plurality of application servers within a network domain for the application.

3. The method of claim 1, wherein determining that the first network interaction with the application has ceased comprises determining that all connections to the application have ceased for at least a threshold amount of time.

4. The method of claim 1, wherein detecting a client initiating a first network interaction with an application comprises performing transport layer security (TLS) parsing to identify an application name for the application from an encrypted connection.

5. The method of claim 1, wherein the machine learning model is trained on one or more previous interactions with the application for a first geographic region, and wherein the method comprises determining that the client is located with the first geographic region.

6. The method of claim 1, wherein the machine learning model is trained on one or more previous interactions with the application for a day of the week, and wherein the method comprises determining that the second client interaction occurred during the day of the week.

7. The method of claim 1, wherein building the feature vector comprises measuring one or more of: application response time, connection lifetime, bitrate, total bytes, number of packets, a packet size distribution, and a number of connections.

8. The method of claim 1, wherein building the feature vector comprises including one or more feature time window metrics characterizing a window of time at an end of the second network interaction.

9. The method of claim 1, comprising outputting a total mean squared error (MSE) score for the feature vector and one or more feature-specific MSE scores.

10. A system for detecting network service anomalies, the system comprising:
   one or more processors and memory storing executable instructions for the one or more processors;
   a visibility behavior analysis system (VBAS) implemented on the one or more processors and configured for:
   during a learning phase:
      detecting a client initiating a first network interaction with an application and recording a start time for the first network interaction with the application;
      determining that the first network interaction with the application has ceased and recording an end time for the first network interaction; and
      determining, based on the start time and the end time, a first application interaction rate for the first network interaction with the application; and
   during a detection phase:
      detecting the client initiating a second network interaction with the application;
      determining a second application interaction rate for the second network interaction; and
      determining that a network service anomaly occurred during the second network interaction based on the first application interaction rate and the second application interaction rate, wherein determining that the network service anomaly occurred comprises determining that the second network interaction has ceased, building a feature vector comprising the second application interaction rate and one or more other metrics observed during the second network interaction, supplying the feature vector to a machine learning model trained on one or more previous interactions with the application, and using an output of the machine learning model to determine that the network service anomaly occurred during the second network interaction.

11. The system of claim 10, wherein the first network interaction with the application comprises a plurality of different encrypted connections between the client and a plurality of application servers within a network domain for the application.

12. The system of claim 10, wherein determining that the first network interaction with the application has ceased comprises determining that all connections to the application have ceased for at least a threshold amount of time.

13. The system of claim 10, wherein detecting a client initiating a first network interaction with an application comprises performing transport layer security (TLS) parsing to identify an application name for the application from an encrypted connection.

14. The system of claim 10, wherein the machine learning model is trained on one or more previous interactions with the application for a first geographic region, and wherein the VBAS is configured for determining that the client is located with the first geographic region.

15. The system of claim 10, wherein the machine learning model is trained on one or more previous interactions with the application for a day of the week, and wherein the VBAS is configured for determining that the second client interaction occurred during the day of the week.

16. The system of claim 10, wherein building the feature vector comprises measuring one or more of: application response time, connection lifetime, bitrate, total bytes, number of packets, a packet size distribution, and a number of connections.

17. The system of claim 10, wherein building the feature vector comprises including one or more feature time window metrics characterizing a window of time at an end of the second network interaction.

18. The system of claim 10, wherein the VBAS is configured for outputting a total mean squared error (MSE) score for the feature vector and one or more feature-specific MSE scores.

* * * * *

UNITED STATES PATENT AND TRADEMARK OFFICE
CERTIFICATE OF CORRECTION

| | | |
|---|---|---|
| PATENT NO. | : 12,401,563 B2 | Page 1 of 1 |
| APPLICATION NO. | : 18/109826 | |
| DATED | : August 26, 2025 | |
| INVENTOR(S) | : Marc Owen Magnuson et al. | |

It is certified that error appears in the above-identified patent and that said Letters Patent is hereby corrected as shown below:

In the Specification

In Column 1, Line 8, delete "63/437,108" and insert -- 63/437,708 --.

Signed and Sealed this
Twenty-eighth Day of October, 2025

John A. Squires
*Director of the United States Patent and Trademark Office*